(12) United States Patent
Okamoto et al.

(10) Patent No.: US 6,769,730 B2
(45) Date of Patent: Aug. 3, 2004

(54) VEHICLE WINDSHIELD MOUNTING STRUCTURE

(75) Inventors: Yutaka Okamoto, Wako (JP); Yuji Kikuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/449,164

(22) Filed: May 30, 2003

(65) Prior Publication Data

US 2003/0227191 A1 Dec. 11, 2003

(30) Foreign Application Priority Data

Jun. 10, 2002 (JP) ........................................ 2002-169178

(51) Int. Cl.[7] ................................................. B60J 1/02
(52) U.S. Cl. .............. 296/96.22; 296/84.1; 296/187.04; 296/201
(58) Field of Search ...................... 296/84.1, 92, 96.21, 296/96.22, 146.15, 187.03, 187.04, 187.05, 201

(56) References Cited

U.S. PATENT DOCUMENTS

| 3,843,193 A | 10/1974 | Krings et al. | |
|---|---|---|---|
| 6,193,304 B1 | * 2/2001 | Takahashi et al. | ....... 296/96.21 |
| 6,193,305 B1 | * 2/2001 | Takahashi | ................ 296/96.21 |

FOREIGN PATENT DOCUMENTS

JP 04019136 A 1/1992

* cited by examiner

*Primary Examiner*—Lori L. Coletta
(74) *Attorney, Agent, or Firm*—Merchant & Gould, P.C.

(57) ABSTRACT

A windshield mounting structure includes A-pillars for mounting a windshield and frangible members provided at the A-pillars for supporting the windshield. When an object collides with the windshield from the vehicle outside, the frangible members deform or break, thereby causing the windshield to move in its entirety or in part inward into a passenger compartment, absorbing the impact in collision.

1 Claim, 9 Drawing Sheets

VEHICLE WINDSHIELD MOUNTING STRUCTURE

FIELD OF THE INVENTION

The present invention relates to a vehicle windshield mounting structure for mitigating impact on collision objects when the collision objects collide with windshields from the front of vehicles.

BACKGROUND OF THE INVENTION

As this kind of windshield, a laminated safety glass consisting of an annealing glass, a resin interlayer bonded to the interior-side surface of the annealing glass and an impermeable film bonded to the interior-side surface of the resin interlayer is known as disclosed, for example, in Japanese Patent Laid-Open Publication No. HEI-4-19136.

Figure 10A:
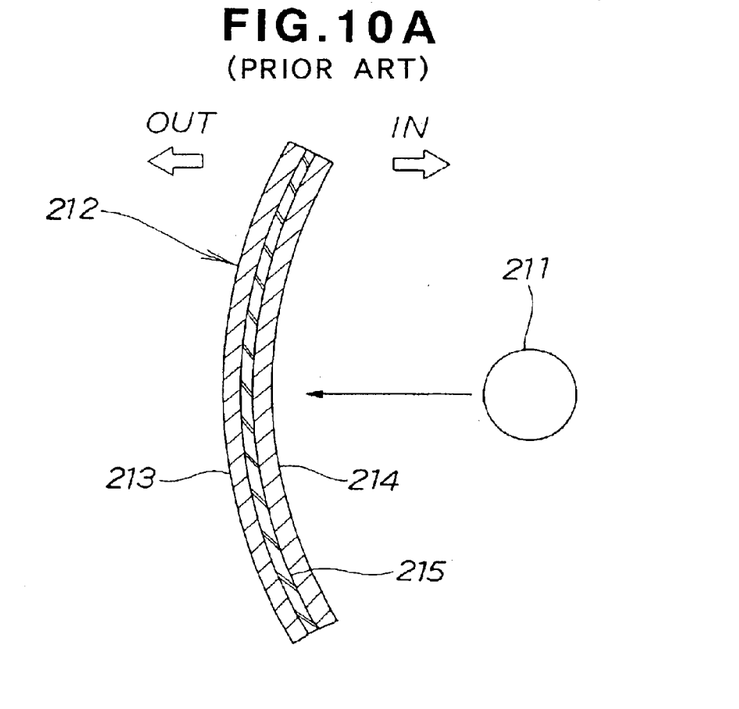
FIGS. 10A and 10B are cross-sectional views of the conventional windshield.
Figure 10B:
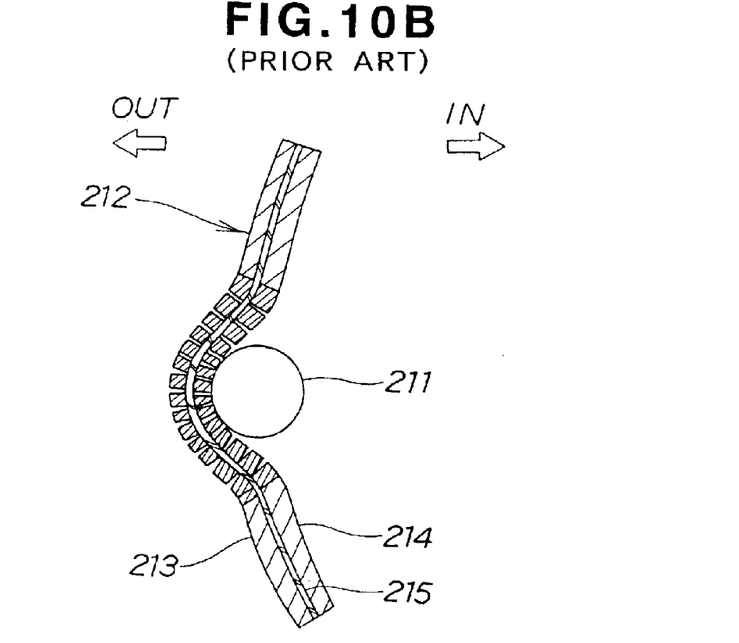

As another example of such a windshield, a windshield shown in FIGS. 10A and 10B is known. These figures illustrate a state in which a collision object is colliding with a windshield from the interior of a passenger compartment. In the figures, OUT indicates the outside of the passenger compartment and IN the inside of the passenger compartment.

FIG. 10A illustrates a state in which a collision object 211 is heading toward a windshield 212. The windshield 212 is made from a glass having two glasses 213 and 214 curved from the passenger compartment toward the vehicle outside, bonded together with an interlayer 215 (hereinafter referred to as a "laminated glass").

The laminated safety glass in HEI-4-19136 or the windshield 212 shown in FIG. 10A takes into account the safety of vehicle passengers, and mitigates impact on the head of a passenger hitting against the laminated safety glass or the windshield 212 upon a vehicle collision. However, no consideration is given to the safety of pedestrians, that is, a collision object from the outside of the vehicle compartment toward the laminated safety glass or the windshield 212.

In FIG. 10B, when the collision object 211 hits on the windshield 212, the windshield 212 is partly broken, mitigating the impact of collision. However, as described above, the windshield 212 does not allow for impact from the vehicle outside. Further, the windshield 212 has a shape curved outward of the passenger compartment, that is, a so-called "arch" shape in cross section, and is thus more unbreakable against a load from the outside of the passenger compartment than from the inside of the passenger compartment.

Further, recent years' trends toward short-nose vehicles with passenger compartments expanded in space and slant-nose vehicles with front end portions inclined downward to reduce air resistance in high-speed travel result in increased collisions from the vehicle front toward windshields. On the other hand, under an increased rate of seatbelt wearing and the widespread adoption of airbags, importance is being attached to consideration to the safety of pedestrians in addition to the safety of vehicle passengers. In other words, it is desired to improve a vehicle windshield mounting structure so as to effectively mitigate the impact of collision with windshields from the outside of passenger compartments.

SUMMARY OF THE INVENTION

According to the present invention, there is provided a vehicle windshield mounting structure, which comprises: a windshield; mounting members for mounting the windshield; and frangible members provided at the mounting members for supporting the windshield; the frangible members being configured to deform or break when an external force greater than a given force acts on the windshield from the outside of a passenger compartment, thereby causing the windshield to move in its entirety or in part inward into the passenger compartment.

When an external force greater than a given force acts on the windshield from the outside of the passenger compartment, the frangible members deform or brake, so that the windshield can move in its entirety or in part inward into the passenger compartment, further absorbing impact in collision than in conventional windshield mounting structures, and mitigating impact received by a collision object.

In this invention, the frangible members preferably comprise resin members each having at least one notch. Thus providing notches to resin members to be the frangible members can facilitate the formation of the frangible members, resulting in reduction in cost increase.

Further, the use of a material having high toughness for the resin members can allow the windshield to be moved inward into the passenger compartment without breaking the resin members, and to be prevented from falling off the mounting members for retainment.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
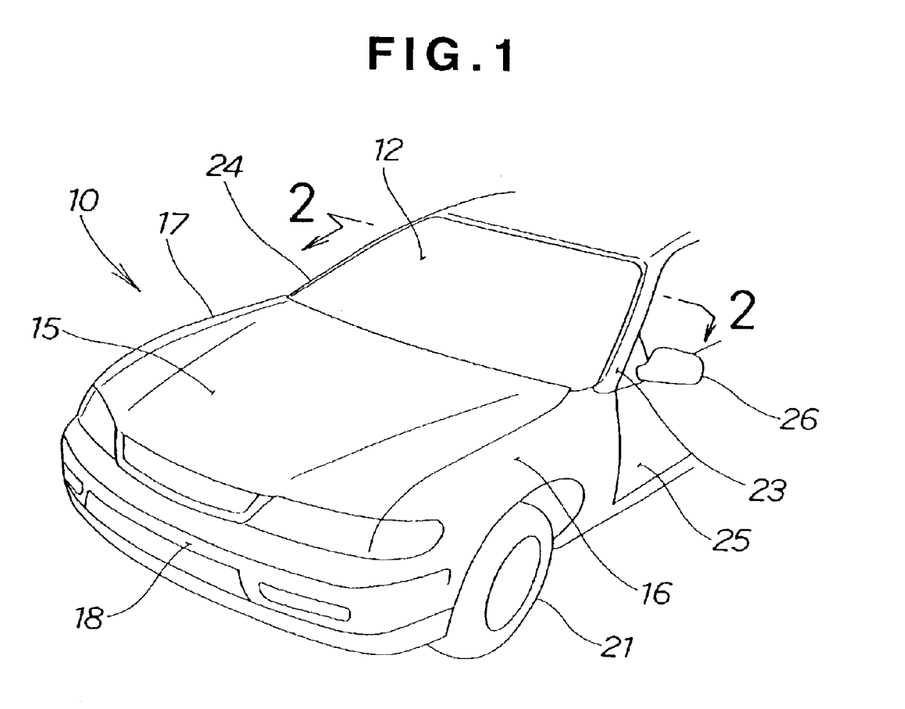
FIG. 1 is a perspective view of a front portion of a vehicle employing a windshield mounting structure according to the present invention.

FIG. 1 is a perspective view of the front of a vehicle employing a windshield mounting structure according to the present invention. A vehicle 10 has a windshield 12 at the front of a passenger compartment. Reference numeral 15 denotes a hood covering an upper portion of an engine compartment, 16 and 17 left and right front fenders, 18 a front bumper, 21 a front wheel (a front wheel on the other side is not shown), 23 and 24 left and right A-pillars, 25 a front door, and 26 a door mirror.

Figure 2:
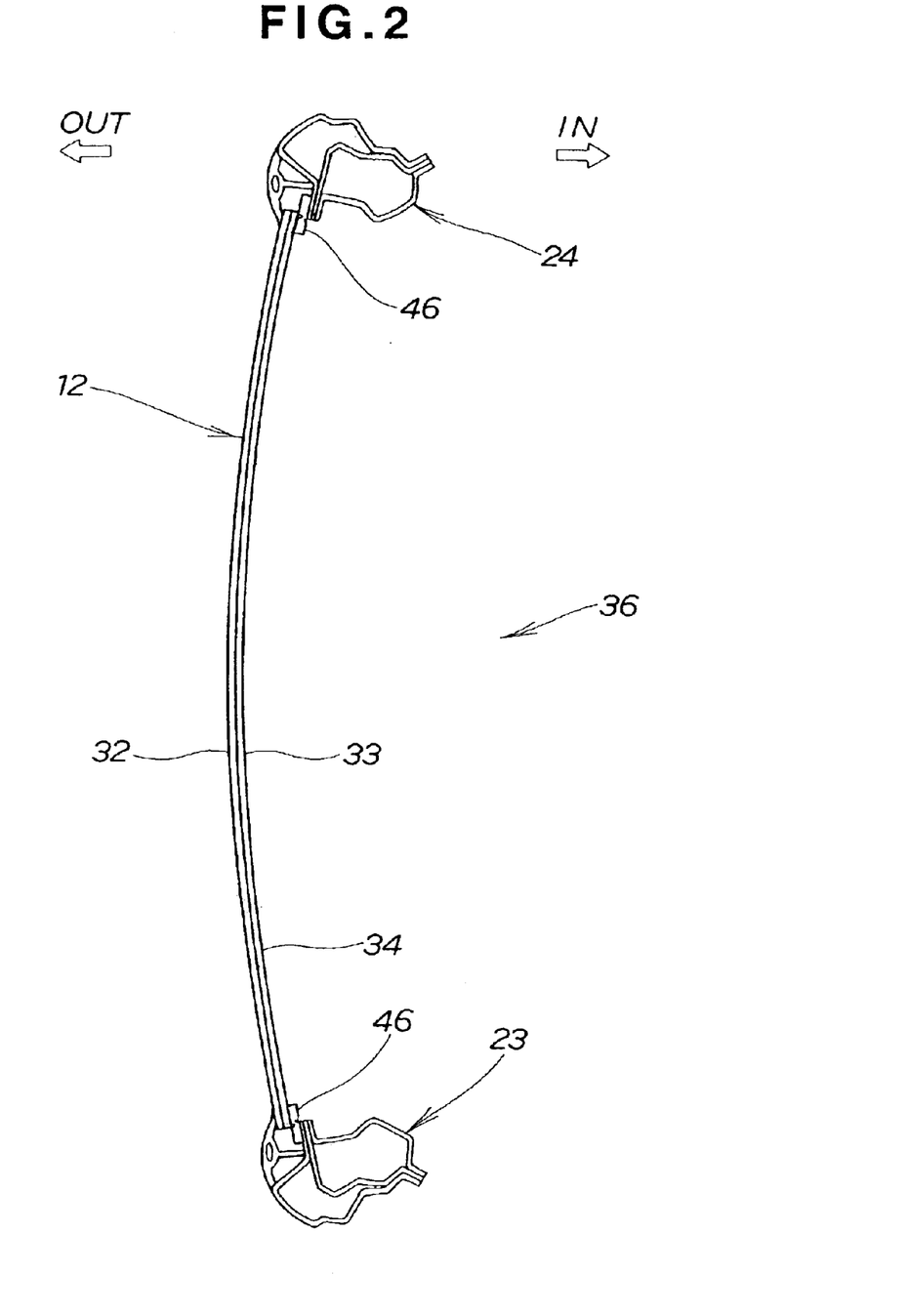
FIG. 2 is a cross-sectional view according to a first embodiment, taken along line 2—2 in FIG. 1.

FIG. 2 illustrates a state in which the windshield 12 is mounted between the left and right A-pillars 23 and 24.

The windshield 12 is a laminated glass consisting of an outer glass 32 arranged outside of the vehicle, an inner glass 33 arranged inside of a passenger compartment 36, and an interlayer 34 interposed between the outer glass 32 and the inner glass 33, bonding the outer glass 32 and the inner glass 33 together. As will be described below, when an external force greater than an external force of a given magnitude acts on the windshield 12 from the outside of the passenger compartment 36, stress is concentrated in the vicinities of the A-pillars 23 and 24 as mounting members of the windshield 12, causing cracks in the windshield 12, and thereby causing the windshield 12 to move in its entirety or in part inward into the passenger compartment 36, so that if an object collides from the outside of the passenger compartment 36, the impact of collision is effectively mitigated.

Figure 3:
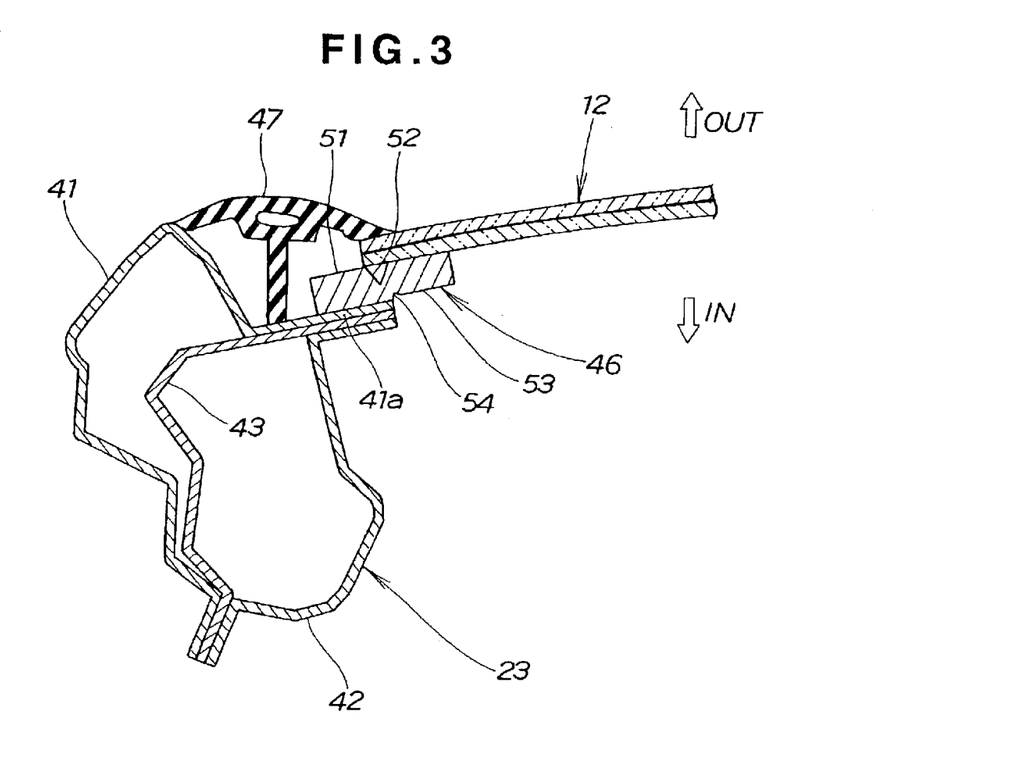
FIG. 3 is an enlarged cross-sectional view illustrating a portion of the windshield mounting structure according to the first embodiment shown in FIG. 2.

FIG. 3 illustrates a windshield mounting structure according to a first embodiment of the present invention. The A-pillar 23 consists of an outer panel 41, an inner panel 42 disposed on the passenger compartment 36 side of the outer panel 41, and a reinforcing panel 43 mounted between the outer panel 41 and the inner panel 42. A resin hinge 46 is attached to a longitudinal end portion 41a of the outer panel 41. The resin hinge 46 is made from frangible material. The windshield 12 is mounted on the resin hinge 46. A windshield molding 47 covers an end of the windshield 12.

The resin hinge 46 has a first notch 52 formed in a first surface 51 on which to mount the windshield 12 and a second notch 54 formed in a second surface 53 opposite to the first surface 51. The first notch 52 and the second notch 54 facilitate the deformation of the resin hinge 46. For the material of the resin hinge 46, polypropylene (PP), a resin having high toughness and excellent flexing-fatigue resistance, is suitable.

To the A-pillar 24 shown in FIG. 2, the windshield 12 is also mounted via a resin hinge 46.

Now the function of the windshield mounting structure according to the above-described first embodiment will be described with reference to FIGS. 4 and 5.

Figure 4:
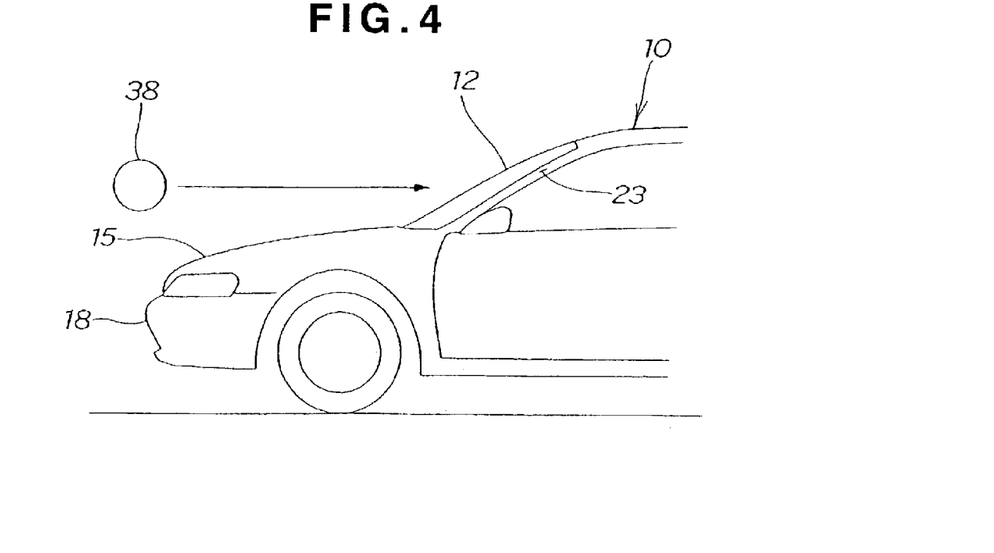
FIG. 4 is a diagram illustrating a state in which a collision object is colliding with a windshield from the front of the vehicle.
Figure 5:
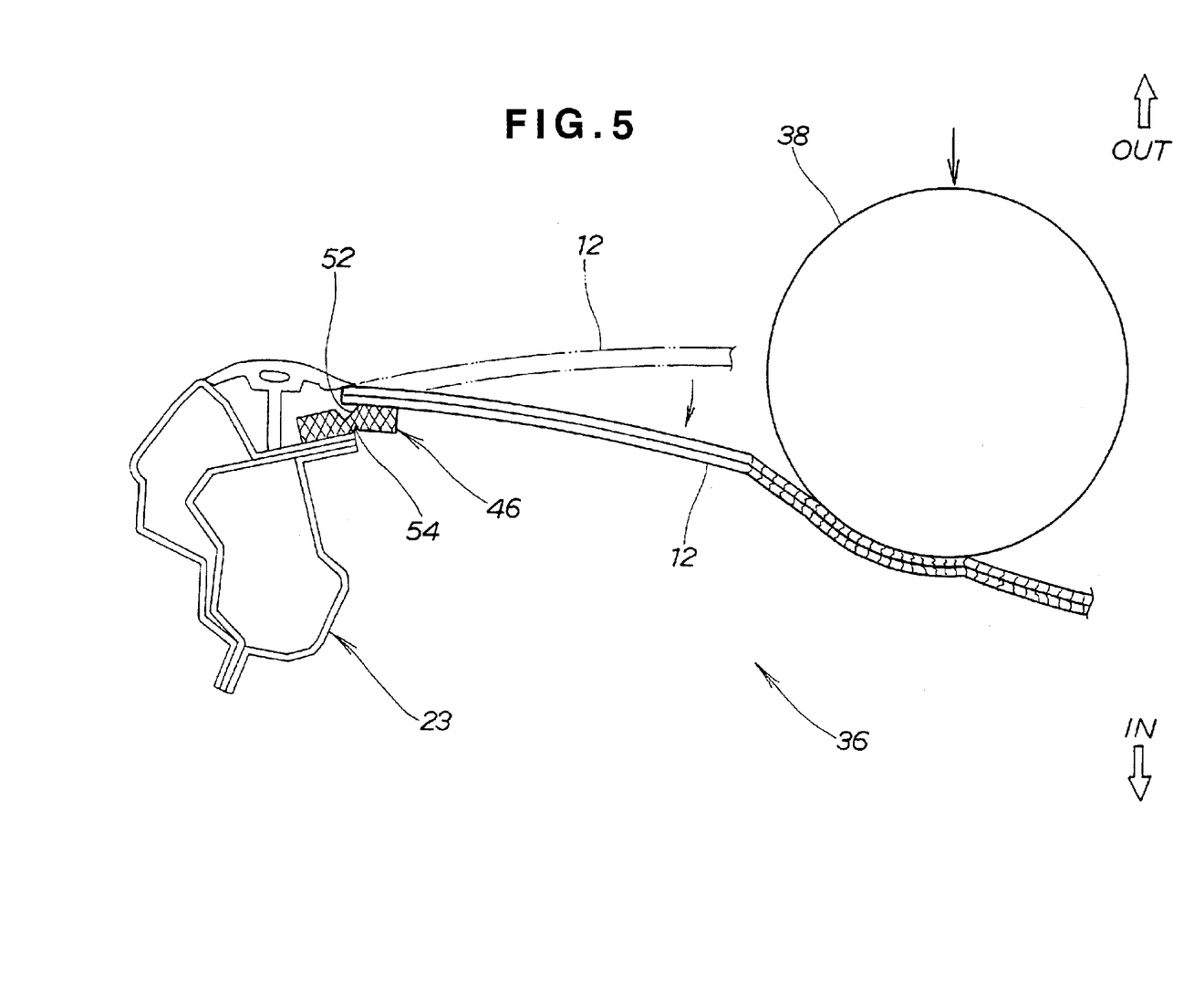
FIG. 5 is a diagram illustrating a state in which the collision object collides with the windshield, deforming a frangible member.

When a collision object 38 heads toward the windshield 12 from the front of the vehicle 10 as shown by an arrow in FIG. 4, and the collision object 38 collides with the windshield 12 as shown in FIG. 5, for example, the resin hinge 46 starts bending at the first notch 52 and the second notch 54. The windshield 12 then flexes largely inward into the passenger compartment 36, absorbing the impact in collision.

Since the resin hinges 46 are not broken, the windshield 12 after collision can be retained on the resin hinges 46, having no possibility of falling off.

As described above with FIGS. 1, 3 and 5, the present invention is first characterized in that the windshield mounting structure of the vehicle 10 for mounting the windshield 12 at the front of the passenger compartment 36 has the resin hinges 46 made from frangible material provided at the left and right A-pillars 23 and 24 as mounting members for the windshield 12, which hinges 46 are deformed when an external force larger than a given force acts on the windshield 12 from the outside of the passenger compartment 36, that is, the object 38 collides with the windshield 12 from the outside of the passenger compartment 36, so that the windshield 12 is moved in its entirety or in part inward into the passenger compartment 36.

When an external force larger than a given force acts on the windshield 12 from the outside of the passenger compartment 36, the resin hinges 46 can thus be deformed, causing the windshield 12 to move in its entirety or in part inward into the passenger compartment 36, further absorbing the impact in collision as compared with conventional windshield mounting structures, thereby mitigating impact force received by the collision object 38.

The present invention is secondly characterized in that the resin hinges 46 are constituted by resin members each having the first notch 52 and the second notch 54.

Providing notches to resin members to be the resin hinges 46 can facilitate the formation of the resign hinges 46 of frangible members, resulting in reduction in cost increase.

The use of a material having high toughness, e.g., polypropylene for the resin members can allow the windshield 12 to be moved inward into the passenger compartment 36 without braking the resin hinges 46 and to be retained on the A-pillars 23 and 24.

Figure 6A:
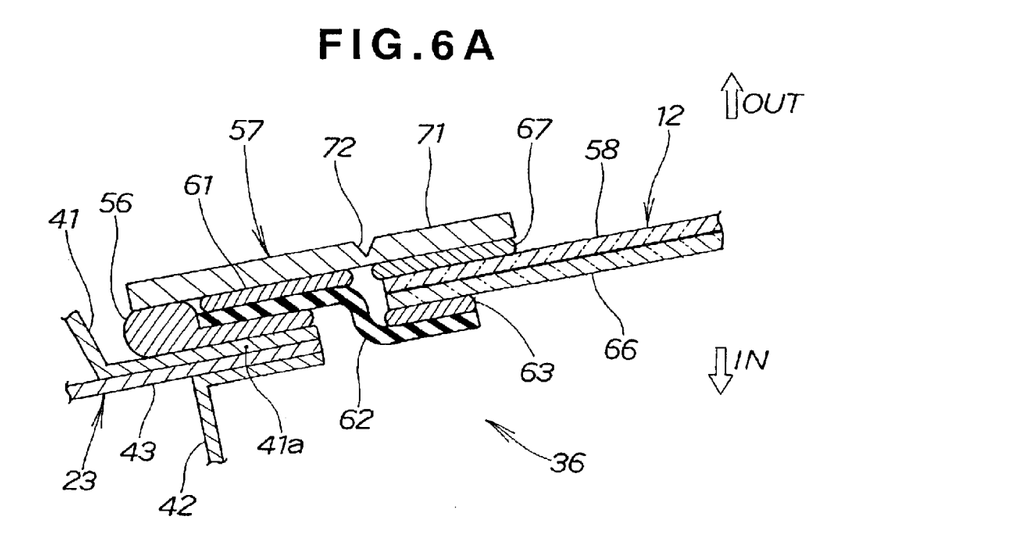
FIGS. 6A and 6B are cross-sectional views illustrating a windshield mounting structure according to a second embodiment of the present invention.
Figure 6B:
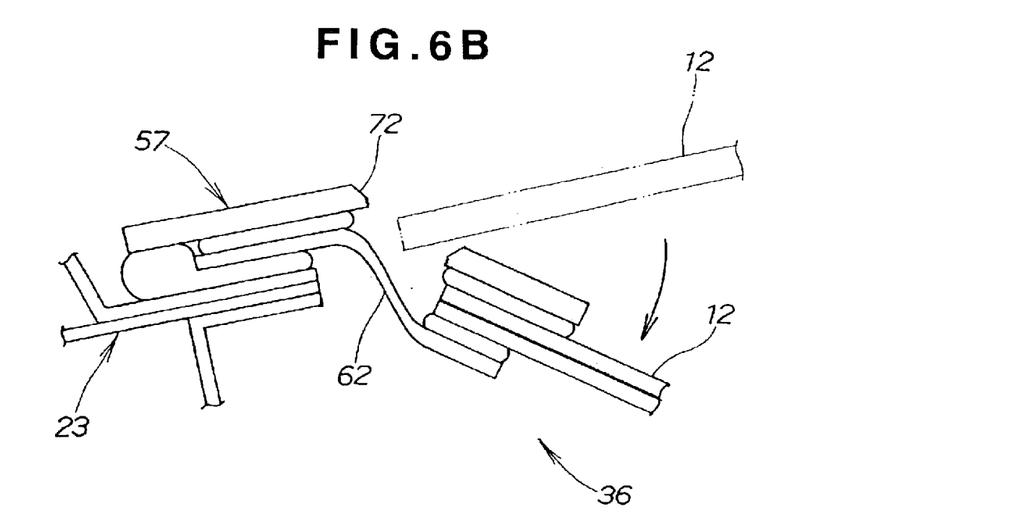

FIGS. 6A and 6B illustrate a windshield mounting structure according to a second embodiment.

As shown in FIG. 6A, a resin support member 57 is bonded with an adhesive 56 to a longitudinal end portion 41a of an outer panel 41 of an A-pillar 23. The resin support member 57 constitutes a frangible member. An outer surface 58 of a windshield 12 is supported by the resin support member 57. A rubber connecting member 62 is fixed at its one end between the end portion 41a of the outer panel 41 and the resin support member 57 via the adhesive 56 and an adhesive 61. An inner surface 66 of the windshield 12 is bonded to the other end of the connecting member 62 via an adhesive 63. The resin support member 57 and the outer surface 58 of the windshield 12 are bonded together with an adhesive 67.

The resin support member 57 has a notch 72 in an outer surface 71 on one side. The notch 72 facilitates the breakage of the resin support member 57.

As shown in FIG. 6B, when a collision object collides with the windshield 12 from the outside of a passenger compartment 36, the windshield 12 receives an impact force, and the impact force causes the resin support member 57 to break from the notch 72. As a result, the windshield 12 largely moves toward the passenger compartment 36, mitigating the impact in collision. At that time, the connecting member 62 connects the A-pillar 23 and the windshield 12, preventing the windshield 12 from falling off.

Figure 7A:
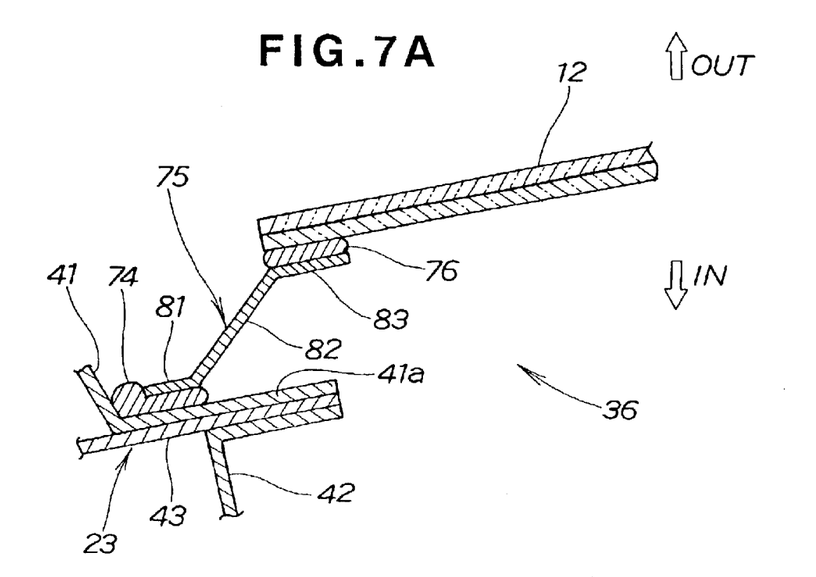
FIGS. 7A and 7B are cross-sectional views illustrating a windshield mounting structure according to a third embodiment of the present invention.
Figure 7B:
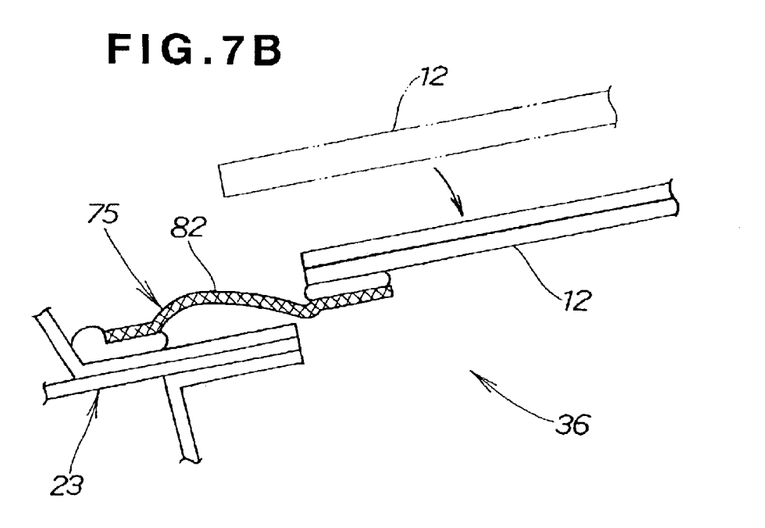

FIGS. 7A and 7B illustrate a windshield mounting structure according to a third embodiment.

As shown in FIG. 7A, a support plate 75 as a frangible member is bonded at its one end with an adhesive 74 to an end portion 41a of an outer panel 41 of an A-pillar 23. The support plate 75 functions as an energy absorbing member for absorbing impact energy when a collision object collides with a windshield 12. The windshield 12 is bonded to the other end of the support plate 75 with an adhesive 76.

The support plate 75 is a steel plate-member consisting of a pillar mounting portion 81 to be attached to the A-pillar 23, a slant portion 82 extending at an angle from the pillar mounting portion 81 toward the windshield 12, and a windshield mounting portion 83 to which the windshield 12 is attached, extending from the front end of the slant portion 82 in parallel with the pillar mounting portion 81.

As shown in FIG. 7B, when a collision object collides with the windshield 12 from the outside of a passenger compartment 36, the impact force acting on the windshield 12 causes the slant portion 82 of the support plate 75 to flex largely toward the passenger compartment 36, that is, to deform, and the windshield 12 largely moves inward into the passenger compartment 36. As a result, the support plate 75 absorbs impact energy acting on the windshield 12, mitigating the impact.

In place of the support plate 75, a member of a honeycomb structure or a bellows structure may be interposed as an energy absorbing member between the A-pillar 23 and an end of the windshield 12.

Figure 8A:
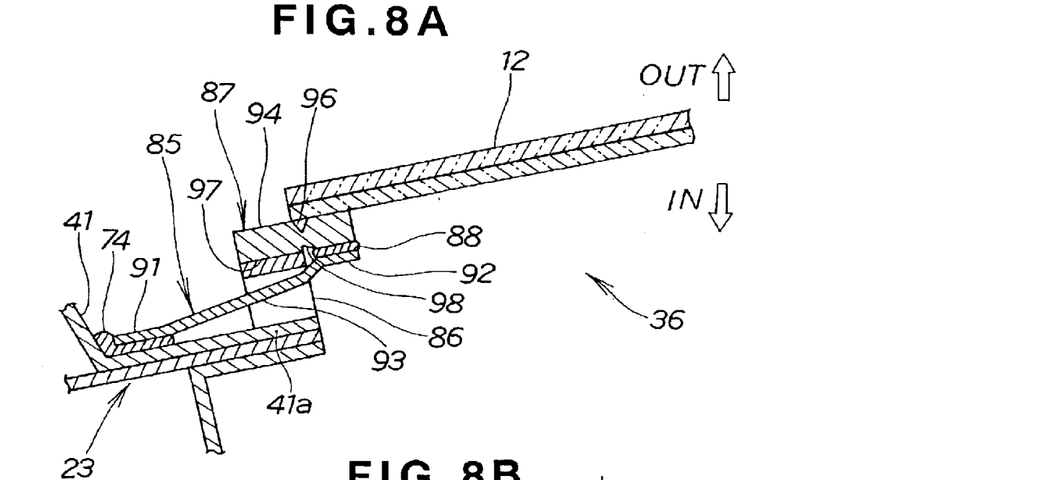
FIGS. 8A to 8C are cross-sectional views illustrating a windshield mounting structure according to a fourth embodiment of the present invention.
Figure 8B:
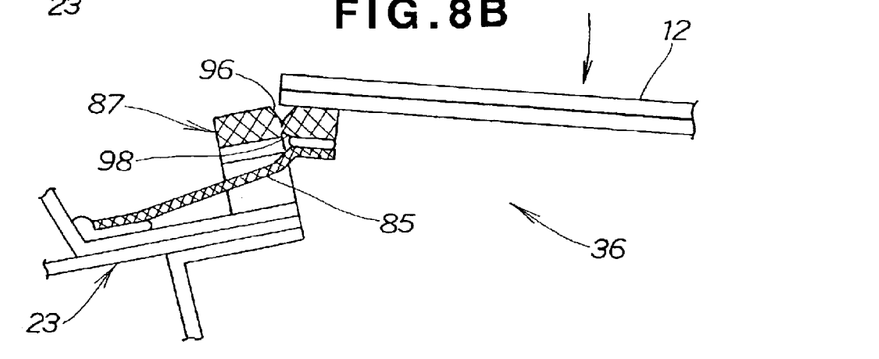
Figure 8C:
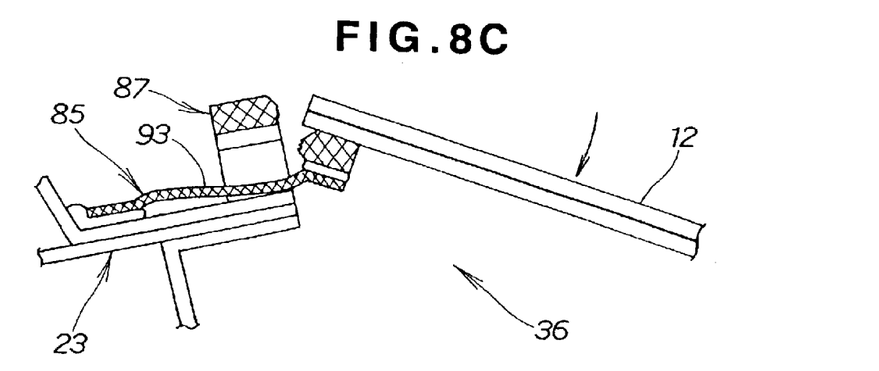

FIGS. 8A to 8C illustrate a windshield mounting structure according to a fourth embodiment.

As shown in FIG. 8A, a support plate 85 as a frangible member is attached at its one end with an adhesive 74 to an end portion 41a of an outer panel 41 of an A-pillar 23. A support base 86 is fixed to an end portion of the outer panel 41 in such a manner as straddling the support plate 85. A resin support member 87 as a frangible member is attached to the support base 86. To the resin support member 87, the other end of the support plate 85 is attached with an adhesive 88. A windshield 12 is mounted to the resin support member 87.

The support plate 85 is a steel plate member consisting of a pillar mounting portion 91 to be attached to the A-pillar 23, a support member mounting portion 92 to be attached to the resin support member 87, and a connecting portion 93 for connecting the pillar mounting portion 91 and the support member mounting portion 92.

The resin support member 87 has a first notch 96 provided in a first-side surface 94 and a second notch 98 provided in a second-side surface 97. The second-side surface 97 is attached on its one side with the second notch 98 as a border to the support base 86, and is attached the support plate 85 on the other side.

In FIG. 8B, when an object collides with the windshield 12 from the outside of a passenger compartment 36, the impact force acting on the windshield 12 causes the resin support member 87 to start breaking at the first notch 96 and the second notch 98, and the windshield 12 moves inward into the passenger compartment 36.

In FIG. 8C, after the resin support member 87 breaks, the connecting portion 93 of the support plate 85 largely flexes, causing the windshield 12 to move largely inward into the passenger compartment 36. As a result, the support plate 85 absorbs impact energy acting on the windshield 12, mitigating the impact in collision.

In the fourth embodiment, the resin support member 87 and the support plate 85 can cause the windshield 12 to move in two stages inward into the passenger compartment 36, allowing a greater amount of movement of the windshield 12, and further absorbing impact energy.

Figure 9A:
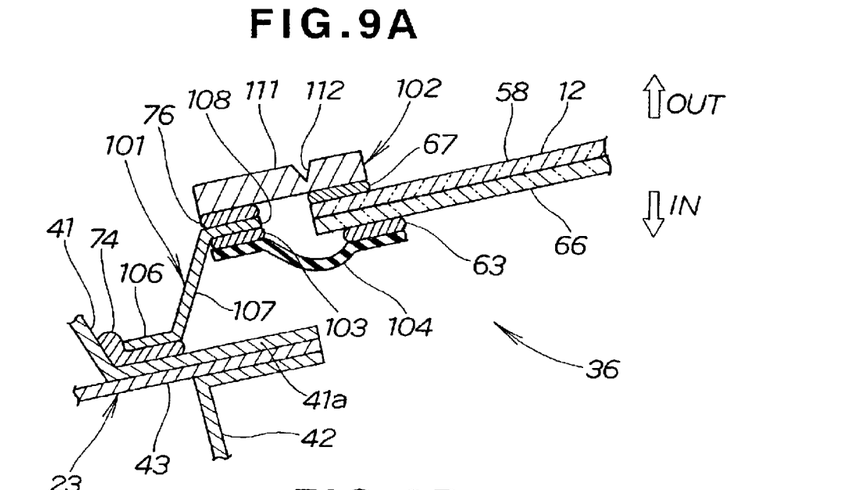
FIGS. 9A to 9C are cross-sectional views illustrating a windshield mounting structure according to a fifth embodiment of the present invention.
Figure 9B:
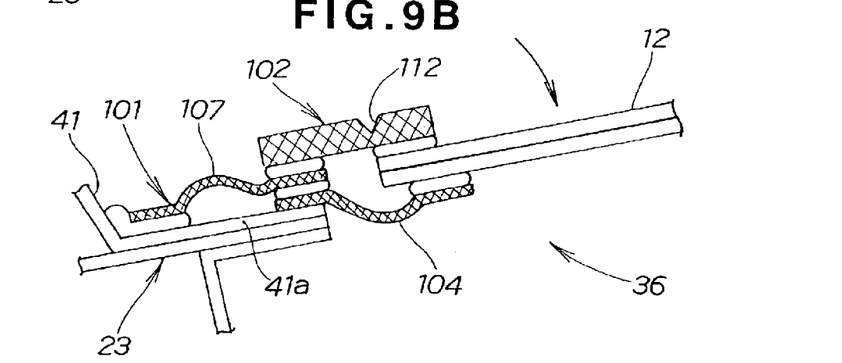
Figure 9C:
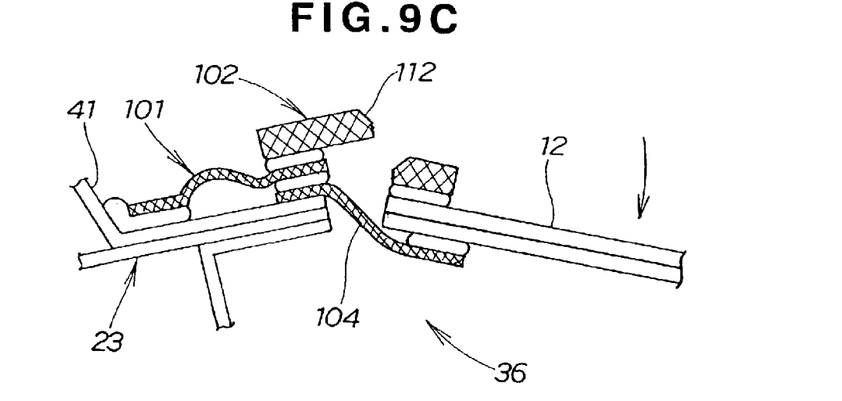

FIGS. 9A to 9C illustrate a windshield mounting structure according to a fifth embodiment.

As shown in FIG. 9A, a support plate 101 of a frangible member is bonded at its one end with an adhesive 74 to an end portion 41a of an outer panel 41 of an A-pillar 23. To the other end of the support plate 101, a resin support member 102 as a frangible member is attached with an adhesive 76. An outer surface 58 of a windshield 12 is attached to the resin support member 102 with an adhesive 67. To the other end of the support plate 102, a rubber connecting member 104 is attached at its one end with an adhesive 103. The other end of the connecting member 104 is attached to an inner surface 66 of the windshield 12 with an adhesive 63.

The support plate 101 is, like the support plate 75 in the third embodiment shown in FIG. 7A, a steel plate member consisting of a pillar mounting portion 106, a slant portion 107, and a windshield mounting portion 108. The resin support member 102 has a notch 112 formed in a first-side surface 111.

In FIG. 9B, when an object collides with the windshield 12 from the outside of a passenger compartment 36, the impact force acting on the windshield 12 causes the slant portion 107 of the support plate 107 to largely flex, and the windshield 12 largely moves inward into the passenger compartment 36.

When the other end of the support plate 101 or specifically the one end of the connecting member 104 attached to the support plate 101 abuts on the end portion 41a of the outer panel 41 of the A-pillar 23, impact force acts on the resin support member 102 as shown in FIG. 9C, and the resin support member 102 starts breaking at the notch 112, so that the windshield 12 further moves inward into the passenger compartment 36, absorbing impact energy acting on the windshield 12, and mitigating the impact in collision.

At that time, the connecting member 104 connects the A-pillar 23 and the windshield 12, preventing the windshield 12 from falling off.

In the fifth embodiment, as in the fourth embodiment shown in FIG. 8A, the support plate 101 and the resin support member 102 cause the windshield 12 to move in two stages inward into the passenger compartment 36, allowing a greater amount of movement of the windshield 12, and resulting in further absorption of impact energy.

In the above-described embodiments, frangible members of the resin support members 46, 57, 87 and 102, and frangible members of the support plates 75, 85 and 101 are separately provided to the A-pillars 23 as mounting members of the windshields 12, but the present invention is not limited thereto. A frangible member may be provided integrally to a mounting member of the windshield 12 or directly integrally to the windshield 12.

In the first embodiment shown in FIG. 3, the resign hinge 46 is provided with both the first notch 52 and the second notch 54, which is not limiting. Only one of the first notch 52 and the second notch 54 may be provided.

The present disclosure relates to the subject matter of Japanese Patent Application No. 2002-169178, filed Jun. 10, 2002, the disclosure of which is expressly incorporated herein by reference in its entirety.

What is claimed is:

1. A vehicle windshield mounting structure, comprising:
   a windshield,
   mounting members for mounting said windshield; and
   frangible members provided at said mounting members for supporting said windshield, said frangible members being resin members each having at least one notch;
   said frangible members being configured to deform or break when an external force greater than a given force acts on said windshield from the outside of a passenger compartment, thereby causing said windshield to move in its entirety or in part inward into said passenger compartment.

* * * * *